July 25, 1933.    E. R. MAURER    1,919,797
TIE ROD END
Filed July 13, 1931

Fig. 1
Fig. 2
Fig. 3
Fig. 4

Inventor:
Edwin R. Maurer.

By Charles W. Hill
Attys.

Patented July 25, 1933

1,919,797

UNITED STATES PATENT OFFICE

EDWIN R. MAURER, OF DETROIT, MICHIGAN, ASSIGNOR TO THOMPSON PRODUCTS INCORPORATED, OF CLEVELAND, OHIO, A CORPORATION OF OHIO

TIE ROD END

Application filed July 13, 1931. Serial No. 550,326.

This invention relates to rod joints and particularly to a type of joint known as a ball joint and used extensively on automobile tie rods.

It is an object of this invention to provide a simple and expedient type of joint which functions as a ball joint, but which obviates the necessity of providing a spherical stud end.

It is a further object of this invention to provide a tie rod joint, the stud member of which is of general conical shape and seated in recessed seat members, and which is provided with means for causing the automatic adjustment of the stud member in the seat members.

It is a particular object of this invention to provide a joint for tie rods comprising a bifurcated stud member having tapered segmental cylindrical outer surfaces, a housing having seat members conforming to the outer contours of the stud member, and means for adjusting said joint to compensate for wear.

It is also an object of this invention to provide a simple and efficient method of assembling a "ball joint".

These and other objects of this invention will be apparent from the following description and appended claims.

The invention (in a preferred form) is illustrated in the accompanying drawing, and hereinafter more fully described.

On the drawing:

Figure 1 is a cross-sectional view of a tie rod end portion of a tie rod embodying my improved joint.

Figure 2 is a sectional view taken on line II—II of Figure 1.

Figure 3 is a side elevational view of the stud member.

Figure 4 is a side elevational view of the stud member having its bifurcated end spread to a V-shape.

As shown on the drawing:

In carrying out this invention, a tie rod 1 is threaded at its end as shown at 2 and provided with a housing member 3. The said member 3 has a cylindrical portion 4 with internal screw threads 5 for receiving the threaded end 2 of the tie rod 1. The cylindrical portion 4 is slit along its under surface as shown at 6 and is provided with opposed sets of lugs 7 through which bolts may be threaded for securely fastening the housing member to the tie rod.

The housing 3 is provided with a cylindrical recess 9 terminating in a hemispherical concave portion 10 at the top thereof. The top of the housing is provided with an aperture 11 through which the stud member 12 extends, leaving a peripheral flange 13, about the aperture.

The stud member 12 has a frusto-conical portion 14 about which a connecting rod 15 is fitted and a threaded end portion 16 at the top thereof.

A suitable helical spring 17 is positioned about the stud 12 between the connecting member 15 and a dust cover 18 and washer 19 on top of the flattened surface of the peripheral flange 13 on housing 3.

As shown in Figure 3, the lower end portion of the stud member is bifurcated to provide tongues 21 provided with convex cylindrical outer surfaces 22 and concave inner surfaces 22a. When assembled, the bifurcated end portion of the stud member is spread out into a V-shape as shown in Figure 4.

The housing is provided with a pair of seat members 23 whose outer surfaces 24 form portions of a sphere and which fit snugly against the hemispherical portion 10 of the inner wall of the housing 3. The inner surfaces 25 of the seat members are cylindrically concave and the seat members are set at such an angle when in use that the inner surfaces thereof snugly fit and ride upon the outer surfaces 22 of the spread out bifurcated end portion of the stud.

The lower end of the housing is provided with an annular recess 26 into which a disc-like closure member 27 is fitted.

A helical spring 28 fits against the inner portion of the bifurcated stud member and is urged thereagainst by its coaction with the disc-like closure member 27.

It will be seen that the spread-out bifurcated portion of the stud member provides two sloping arcuate surfaces which rest against the corresponding sloping inner faces of the seat members. As the stud member is pressed upwardly by the spring it snugly fits the seat members and consequently it will be seen that the spring member and associated parts provide an automatic take-up for wear as well as a cushioning means for any shock which may be administered to the joints. The spring on the top of the housing cushions the housing against upward movement on the stud. The V portion of the stud holds the seat members in place in the housing and serves to keep the parts of the joint in assembled relation.

The stud and seat members move as a unit in the housing and due to the spherical outer surfaces contacting with the hemispherical top portion of the housing permit the stud to rotate in the housing and move angularly with respect thereto.

In assembling the joints, the seat members are placed in the housing and the stud member is passed into the housing with its upper end projecting through the aperture at the top of the housing. The bifurcated end of the stud member is machined to provide cylindrical surfaces and is spread outwardly into a V-shape so as to force the outer surfaces thereof against the inner surfaces of the seat member. Then the spring is put in place against the inner side of the stud member and the closure is forced into place.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. A ball joint comprising an inverted cup shaped housing having an opening in the top thereof, seat members rotatably mounted in said housing, said seat members having outer spherical surfaces conforming to and in contact with a portion of the inner wall of said housing and having inner arcuate surfaces, a stud member extending through the opening in the top of said housing, said stud member having an end portion in said housing provided with inclined discontinuous arcuate surfaces received by said seat members, a closure for said housing and resilient means against said closure member for urging said stud upwardly to separate said seat members.

2. A ball joint for automobile tie rods comprising an inverted cup shaped housing, a stud member therein, said stud member having a V-shaped bifurcated end portion with inclined cylindrical outer faces and seat members in said housing and about said stud, said seat members having spherical outer surfaces conforming to and contacting with a portion of the inner wall of said housing and inclined inner surfaces for receiving said stud member.

3. A ball joint for automobile tie rods comprising a housing, seat members in said housing having spherical outer faces contacting the inner wall of said housing and inclined inner faces and a stud member having a V-shaped bifurcated end portion resting in said seat members.

4. A ball joint comprising an inverted cup shaped housing, seat members rotatably mounted in said housing and having inclined inner surfaces, a stud member having a V-shaped bifurcated end portion resting in said seat members, a closure for said housing and resilient means acting against said closure member for forcing said stud member into engagement with said seat members.

5. A ball joint comprising an inverted cup shaped housing having a hemispherical upper wall with an aperture therethrough, a closure firmly positioned in the lower end of said housing, spaced seat members in said housing having outer spherical surfaces and inclined inner faces, a stud member extending through the aperture in said top wall having inclined faces contacting the inclined faces of said seat members and means acting against said closure member for urging said stud member into contact with said seat members.

6. A ball joint comprising an inverted cup shaped housing having a hemispherical upper wall with an aperture therethrough, seat members in said housing having outer spherical surfaces and inclined inner surfaces, a stud member extending through the aperture in said top wall having inclined surfaces contacting the inclined surfaces of said seat members, and resilient means in said housing acting against a portion of said housing and against said stud for urging said stud member into contact with said seat members.

7. A ball joint comprising an inverted cup shaped housing having a hemispherical upper wall with an aperture therethrough, a closure member for the bottom of said housing, seat members in said housing, the outer contour of said seat members corresponding to the inner contour of the housing so that said seat members are rotatable therein, a stud member extending through the aperture in said top wall and having a tapering outer surface and means acting against said closure and against said stud for urging said stud to spread said seat members apart.

EDWIN R. MAURER.